(12) United States Patent
Hutton

(10) Patent No.: US 9,156,234 B1
(45) Date of Patent: Oct. 13, 2015

(54) VANISHING COMPACT

(76) Inventor: D. Patrick Hutton, Oklahoma City, OK (US)

( * ) Notice: Subject to any disclaimer, the term of this patent is extended or adjusted under 35 U.S.C. 154(b) by 651 days.

(21) Appl. No.: 13/199,417

(22) Filed: Aug. 29, 2011

Related U.S. Application Data

(60) Provisional application No. 61/402,356, filed on Aug. 27, 2010.

(51) Int. Cl.
*B32B 27/30* (2006.01)
*B25G 1/00* (2006.01)
*B32B 27/32* (2006.01)
*B32B 27/08* (2006.01)

(52) U.S. Cl.
CPC ................. *B32B 27/32* (2013.01); *B32B 27/08* (2013.01)

(58) Field of Classification Search
CPC ...... B29K 2027/06; B25G 1/10; B32B 27/30; C08J 2327/06; C08L 27/06
USPC .................. 215/6, 249; 30/340–344; 428/35.7
See application file for complete search history.

(56) References Cited

U.S. PATENT DOCUMENTS

| | | | | |
|---|---|---|---|---|
| 239,115 | A * | 3/1881 | Roeber | 7/158 |
| 3,741,383 | A * | 6/1973 | Wittwer | 206/219 |
| 4,825,552 | A * | 5/1989 | Bendickson et al. | 30/342 |
| 6,649,664 | B2 | 11/2003 | Nishimoto et al. | 521/50 |
| 7,672,826 | B2 | 3/2010 | Chen et al. | 703/12 |
| 2002/0152914 | A1 | 10/2002 | Cox | 102/501 |
| 2005/0103653 | A1* | 5/2005 | Eckhardt et al. | 206/219 |

OTHER PUBLICATIONS

Hansen, Charles M., Hansen Solubility Parameters, Apr. 2009, http://web.archive.org/web/20090416233903/http:/www.hansen-solubility.com/index.php?id=19.*
PIMall, Self Destructing Spy Paper, Jun. 2010, http://web.archive.org/web/20100618024024/http://www.pimall.com/nais/spypaper.html.*
Gaylord Chemical Company, Dimethyl Sulfoxide (DMSO) Solubility Data, Oct. 2007, http://www.gaylordchemical.com/uploads/images/pdfs/literature/102B_english.pdf.*
Dimethyl Sulfoxide (DMSO) Solubility Data. Bull. #102B of Gaylord Chemical Co. (Oct. 2007) Accessed Aug. 2010 at:—http://www.gaylordchemical.com/bulletins/bulletin102b/Bulletin102B.pdf.
Tetralin properties accessed online on Aug. 27. 2010. at:—http://www.stenutz.eu/chem/solv6.php?name=tetrahydronaphthalene.
Hansen Parameters. MPa½, 2 pgs. published by Dow Haltermann Custom Processing (Jun. 2008).
Solubility Table. 3 pgs. published by Diversified Enterprises. Accessed online Aug. 26, 2010 at:—http://www.accudynetest.com/solubility_table_print.html?sortby=sort/cas.
SLAMMRAAM Gets Self-Destruct. 3 pgs.. published by strategyworld.com. accessed online Jun. 9, 2010 at:—http://www.strategypage.com/htmw/htada/articles/20060731.aspx.
The Knife With Self-Destructing Memory by Stephen Williams. published in the New York Times. accessed Jun. 9, 2009 at:—http://gadgetwise.blogs.nytimes.com/2010/03/31/the-knife-with-self-destructing-memory/?pagemode=print.
"Mission Impossible" Army Knife Will Self-Destruct in 5..4..3.. published by Discover Magazine. accessed Jun. 9, 2010 at http://blogs.discovermagazine.com/discoblog/2010/04/01/mission-impossible-army-knife-will-self-destruct-in.

* cited by examiner

*Primary Examiner* — Gwendolyn Blackwell
*Assistant Examiner* — Kevin Ortman, Jr.
(74) *Attorney, Agent, or Firm* — Jonathan A. Bay

(57) ABSTRACT

A hollow compact has a partition partitioning it into a first interior compartment sealed apart from a second interior compartment. The first compartment is charged with a first solvent, the second compartment with a second solvent. The solubility properties of the first and second solvent are chosen such that neither risks attacking and/or dissolving the compact. Conversely, the solubility properties of the first and second solvent are otherwise chosen such that the mixture of the two indeed possesses an independent set of solubility properties, whereby the mixture is indeed capable of attacking and dissolving the material of the compact. Wherein, breaching the partition allows the charges of the first and second solvents to mix and thereby form the mixture therebetween. That way, the compact might vanish by dissolving into the mixture solvent or else might more likely might dissolve into a nearly un-recognizable form of its former self.

6 Claims, 5 Drawing Sheets

VANISHING COMPACT

CROSS-REFERENCE TO PROVISIONAL APPLICATION(S)

This application claims the benefit of U.S. Provisional Application No. 61/402,356, filed Aug. 27, 2010. The foregoing patent disclosure is incorporated herein by this reference thereto.

BACKGROUND AND SUMMARY OF THE INVENTION

The invention relates a vanishing compact (ie., a small case) and, more particularly, to a plural chamber polymeric compact, each which carries a different solvent that, when mixed, dissolve away the compact into a solution.

The invention comprises the following utility. Assume for example that the compact has the shape of a useful article for a user. The user may want to abandon the article in a hurry, and in the wake of the abandonment, have the article vanish without the user having to wait around and attend to this vanishing process him or herself.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 3:
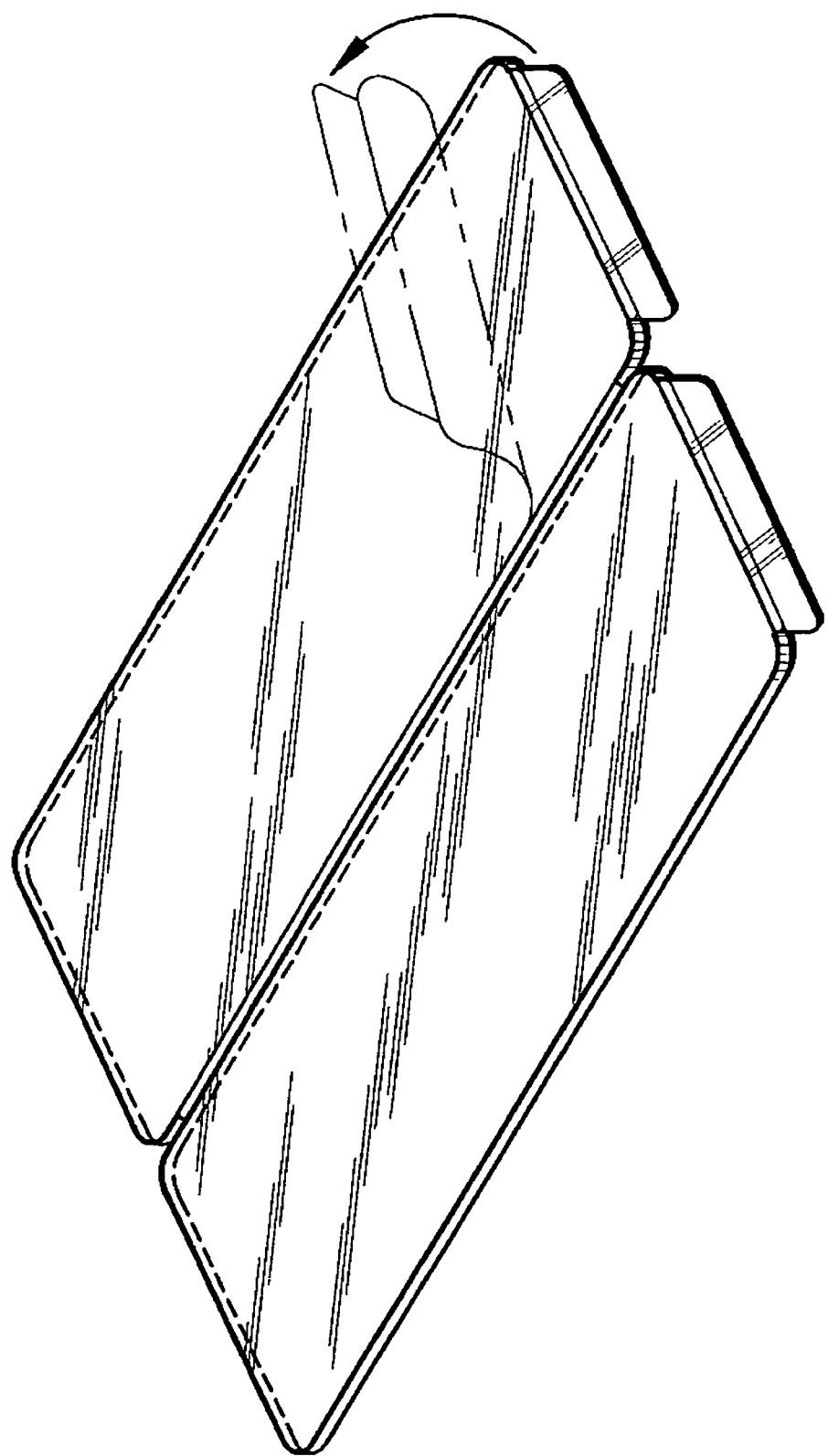
FIG. 3 is a perspective view of a compact in accordance with invention and having one compartment filled with TETRALIN® (tetrahydronaphthalene) and the other with DMSO.

FIG. 3 shows a compact in accordance with invention, comprising a shell of opposite compartments, each having sidewalls defining hollow rectangular cavities with an open rim. The open rims have elongated edges spaced by abbreviated edges. The compartments are joined together along one respective elongated edge by a seam functioning as a hinge. The first compartment is filled with a first solvent, the second with a second solvent. The two solvents are kept apart and from mixing with each other by film strips covering over and sealed to the open rims of the compartments.

It is an aspect of the invention that the compact can represent any number of handheld useful articles for use by a user. It is a more particular aspect of the invention that the user can discard the compact in a toss and, after abandonment, the compact will vanish away under its own resources and leave little clue as to what its true manifestation ever was.

These and other objects and aspects in accordance with the invention are provided by a plastic (polymeric) compact that carries two solvents isolated and separate apart from each other. The solvents are carefully chosen such that plastic compact can safely store either one alone and persist (ie., not be attacked or dissolved by one such solvent alone).

However, when the two solvents mix, the mixture takes on an independent set of solubility properties and is indeed capable of dissolving the plastic compact completely away into solution.

The knowledge of whether a given plastic will dissolve in a given solvent (and form a solution) can often be looked up in compiled data of such plastics and solvents, which data is compiled from results of trial-and-error experiments.

In the absence of such compiled data, there are several models which allow the prediction of whether certain solvents will dissolve or not certain plastics based on physical properties of the plastic and the solvent.

One such model was developed by Charles Hansen. It utilizes three (3) physical properties or 'parameters' for both the solvent and the plastic—eg., the Hansen Solubility Parameters—and a fourth ($4^{th}$) property of the plastic, to predict solubility or not.

That is, both solvents and plastics are given values for the three (3) Hansen solubility parameters described more particularly next. Preliminarily, the Hansen solubiltity parameters are represented in equations and relationship by the lower-case Greek letter 'delta.' Also, the most commonly-used SI units for these parameters are $MPa^{1/2}$. Those SI units are 2.0455 times larger than the other commonly-used set of units, $(cal/cc)^{1/2}$.

Now, the three (3) parameters consist of the following.

$\delta_d$—Correlates to the energy of dispersion bonds between molecules.

$\delta_p$—Correlates to the energy of dipolar intermolecular force between molecules.

$\delta h$—Correlates to the energy of hydrogen bonds between molecules.

These three parameters can be treated as co-ordinates for a point in three dimensions. This is known as Hansen space.

Figure 1:
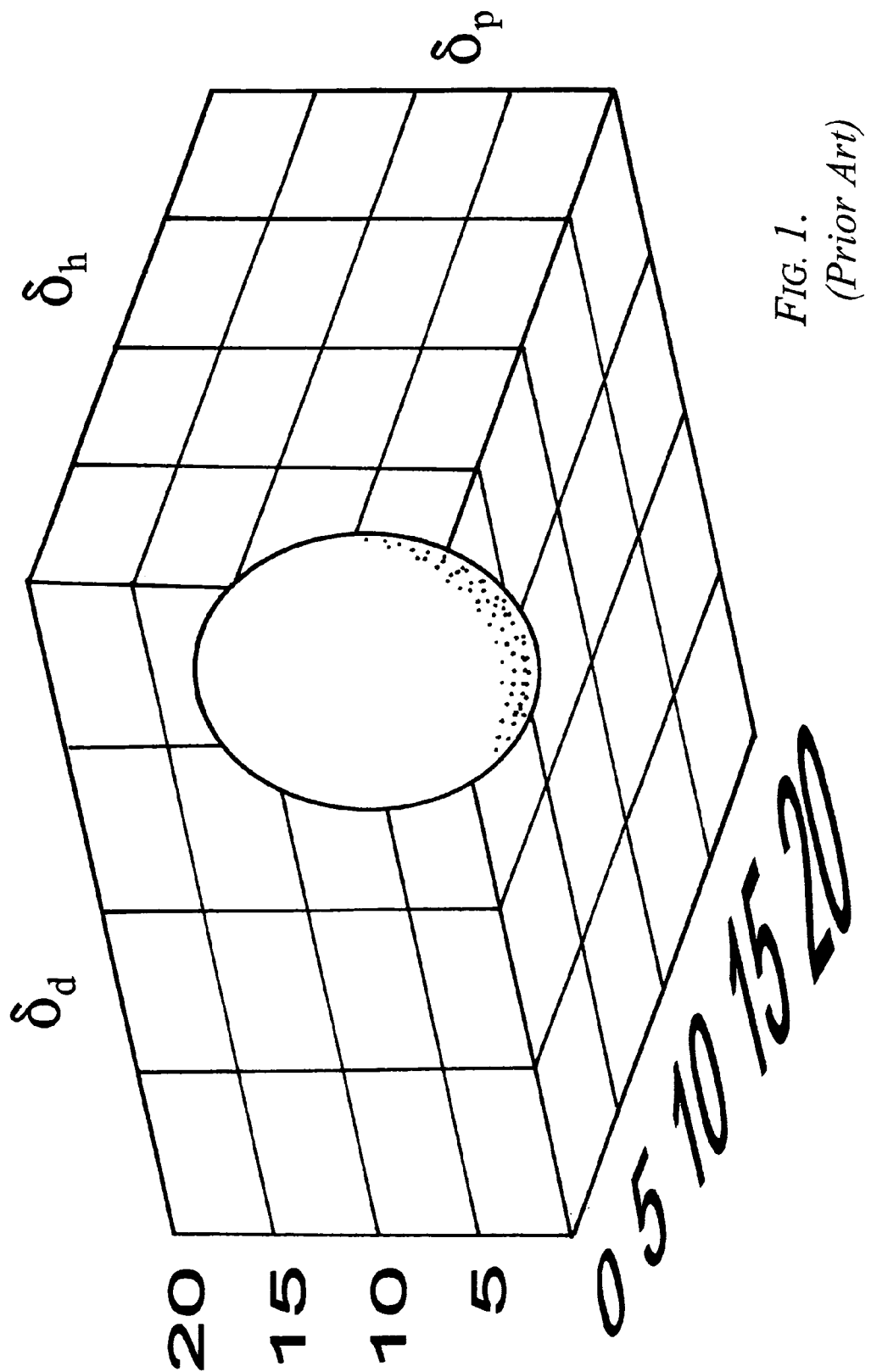
FIG. 1 is a 3-D surface chart of the spherical envelope for a non-specific plastic in Hansen space for finding solvents for that plastic.

An example of Hansen space is shown by FIG. 1. That is, FIG. 1 is a 3-D surface chart of the spherical envelope for a non-specific plastic in Hansen space for finding solvents for that plastic.

Figure 2:
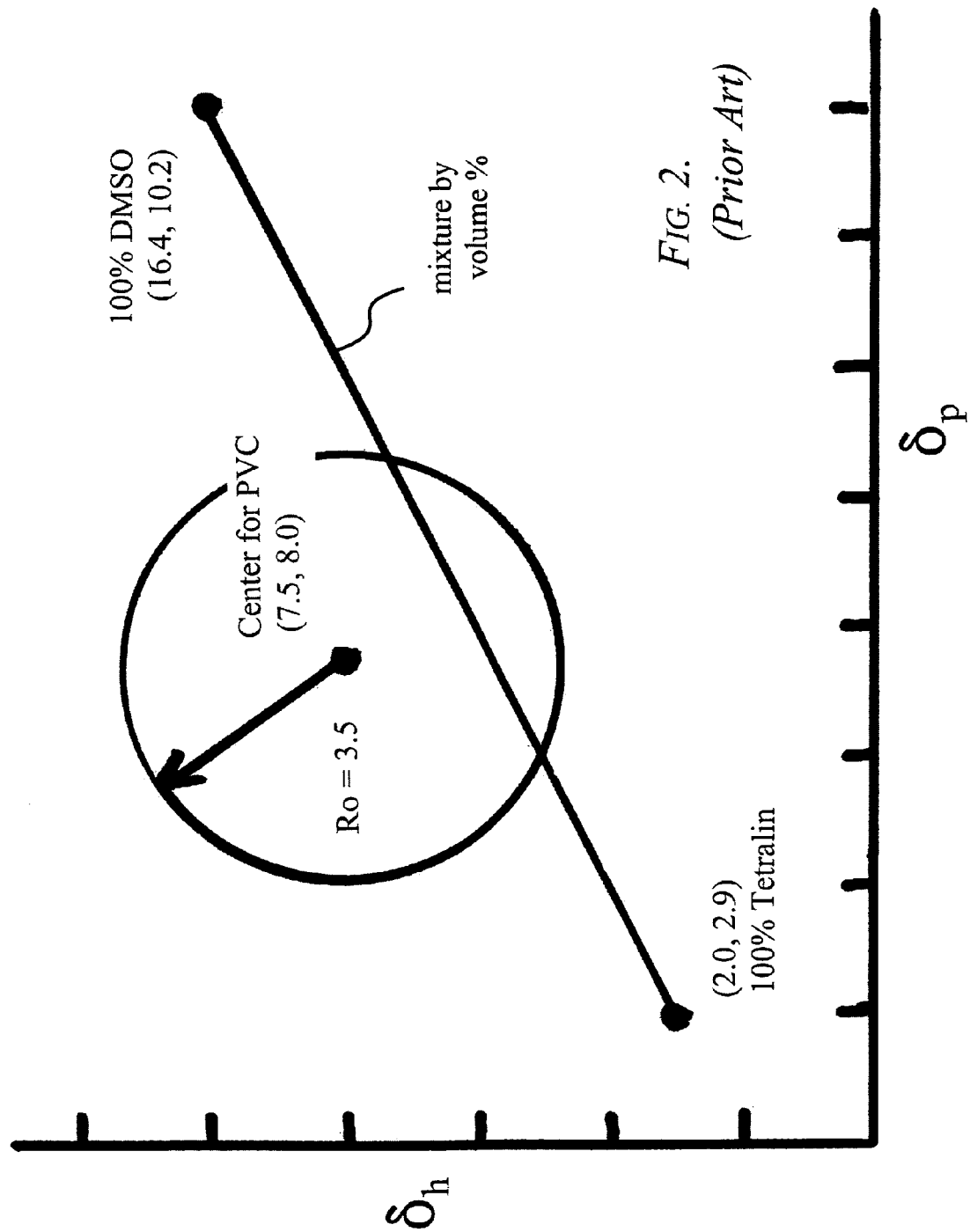
FIG. 2 is a 2-D counterpart to FIG. 1 and charting the solubility of polyvinyl chloride (PVC) in mixtures of TETRALIN® (tetrahydronaphthalene) and DMSO (Dimethyl Sulfoxide)

Solvents in Hansen space are represented by points (none are shown in FIG. 1, but see FIG. 2:—the dots on the surface of the sphere represent stippled surface shading). In contrast, polymers in Hansen space are represented by a spherical envelope and as shown in FIG. 1.

Hence the three (3) Hansen parameters above for a polymer locate the center of its spherical envelope. The fourth ($4^{th}$) property for a plastic (eg., a polymer) is a radius for the spherical envelope in the Hansen space.

Ro Corresponds to the interaction radius for a material.

Good solvents for a plastic generally have coordinates which place a point inside the spherical envelope within the Hansen space. Bad solvents for the plastic have coordinates which place a point outside the sphere.

In Hansen space, there is another measure of interest, and that is the space between points.

Ra Distance in Hansen space between points.

So both a plastic and a solvent have their own three Hansen parameters which can be treated as co-ordinates for a point in the Hansen space. Generally speaking, the closer the two points are in Hansen space, the more likely the solvent and plastic are to dissolve into each other. To determine if the two respective points of the solvent and plastic are close enough to each other such that the solvent dissolves the plastic, it depends if the point of the solvent is proximate the point of the plastic within range of values called the interaction radius (Ro). This value (the interaction radius Ro) determines the radius of the sphere in Hansen space and its center is the three Hansen coordinates for the plastic.

To calculate the distance (Ra) between the Hansen parameters in Hansen space the following formula is used:

$$Ra^2 = 4(\delta_{d2}-\delta_{d1})^2 + (\delta_{p2}-\delta_{p1})^2 + (\delta_{h2}-\delta_{h1})^2 \quad (1)$$

The value "4" in equation (1) is an experimental correction.

To determine if the solvent is a good solvent or not for the plastic depends if the distance (Ra) between the two points in Hansen space is less than the interaction radius (Ro) for the plastic. This is sometimes described by the ratio of equation (2) next, the ratio being called the Relative Energy Difference (RED).

$$Ra/Ro = RED \quad (2)$$

The interaction radius (Ro) is defined such that the following three relationships are true.

If RED<1 then the molecules are alike and will dissolve. (3)

If RED=1 then the system will only partially dissolve. (4)

If RED>1 then system will not dissolve. (5)

Another feature about the Hansen model is that solvents can be designed. That is, two solvents can be mixed (provided they blend) and the resultant mixture will have the average properties of the mixed solvents.

That is, the resultant mixture properties for a 50:50 mix of solvent sub-script "1" and solvent sub-script "2" will be the following mixture properties sub-script 1+2.

$$\delta_{d(1+2)} = (\delta_{d1}+\delta_{d2})/2 \quad (6)$$

$$\delta_{p(1+2)} = (\delta_{p1}+\delta_{p2})/2 \quad (7)$$

$$\delta_{h(1+2)} = (\delta_{h1}+\delta_{h2})/2 \quad (8)$$

EXAMPLE

The following is published data of Gaylord Chemical Co, LLC, of Slidell, La.

Gaylord Chemical represents itself as the worlds leading provider of Dimethyl Sulfoxide (DMSO). See, "Dimethyl Sulfoxide (DMSO) Solubility Data," Bulletin #102B (20 sheets, published by the Gaylord Chemical Co., dated October of 2007). http://www.gaylordchemical.com/bulletins/bulletin102b/Bulletin102B.pdf) (NOTE: the bulletin uses the units $(cal/cc)^{1/2}$, but the data is converted here).

TABLE 1

Polyvinyl Chloride "Vipla" KR Montecatini Solubility of PVC in DMSO/TETRALIN ® (tetrahydronaphthalene) mixtures (RED)

| DMSO % | 100 | 80 | 60 | 50 | 40 | 20 | 0 |
|---|---|---|---|---|---|---|---|
| Tetralin % | 0 | 20 | 40 | 50 | 60 | 80 | 100 |
| | ns | ns | ns | .32 | ns | ns | ns |

NOTE:
Where RED > 1 and hence PVC is not soluble in the mixture, this is indicated as "ns".
NOTE:
The mixtures are indicated by volume percentages.

From the foregoing, PVC is persistent in contact with either DMSO alone, or else TETRALIN® (tetrahydronaphthalene) alone:—and all mixtures therebetween except for 50:50 mixtures and probably a close by range around 50:50 but apparently not as far as to 60:40 or 40:60.

This can be shown graphically by the Hansen parameters for these substances. Table 2 gives the Hansen solubility parameters for these substances.

TABLE 2

Hansen solubility parameters for DMSO, PVC and Tetralin ® (tetrahydronaphthalene)

| | $\delta$ (Mpa)$^{-1/2}$ | | | |
|---|---|---|---|---|
| Substance | $\delta_d$ | $\delta_p$ | $\delta_h$ | Ro |
| Dimethyl Sulfoxide (DMSO) | 18.4 | 16.4 | 10.2 | n/a |
| Polyvinyl chloride (Vilpa ® KR, Montecatini) | 18.2 | 7.5 | 8.3 | 3.5 |
| Tetralin | 19.6 | 2.0 | 2.9 | n/a |

It is not necessary to graphically illustrate the coordinates above given by Table 2 on a 3-D surface chart as FIG. 1. All three substances have nearly the same value for the dispersion-bond parameter $\delta_d$. Hence there is an approximate plane in polar-bond parameter $\delta_p$ and hydrogen-bond parameter $\delta_h$ coordinates alone that nearly contains all three dispersion-bond parameters $\delta_d$ of the three substances. Hence the relevant Hansen parameter information can be illustrated in a simple 2-D chart as shown by FIG. 2.

To turn to FIG. 2, it shows the polar-bond parameter $\delta_p$ along the x-axis and the hydrogen-bond parameter $\delta_h$ along the y-axis. The circle is a slice of the spherical envelope for PVC in Hansen space:—if the spherical envelope were illustrated on a 2-D surface chart like FIG. 1. But it is not so illustrated as here in FIG. 2.

Hence the spherical envelope for PVC is reduced to a circle in FIG. 2. All points located inside the circle represent a good solvent for PVC. The two points where the line intersects the circle represent partial dissolution. All points outside the circle are non-solvents for PVC.

Referring to the polar-bond parameter $\delta_p$ and hydrogen-bond parameter $\delta_h$ values for the substances given in TABLE 2, the following is charted on FIG. 2.

The center of the PVC interaction circle is located at the coordinates (7.5, 8.0). The circle has an interaction radius (Ro) of the length "3.5." The coordinates for 100% TETRALIN® (tetrahydronaphthalene) locate a point at coordinates (2.0, 2.9). The coordinates for 100% DMSO locate a point at the coordinates (16.4, 10.2). Both points lie outside the circle. Hence neither solvent will dissolve PVC.

A line drawn between the point for 100% TETRALIN® (tetrahydronaphthalene) and 100% DMSO represents the locus in Hansen space for the various strength of mixtures between TETRALIN® (tetrahydronaphthalene) and DMSO.

The point representative of a 50:50 mixture by volume percentage would be about the mid-point for the line, and so on.

FIG. 2 confirms the data of the Gaylord Chemical Co. Whereas neither TETRALIN® (tetrahydronaphthalene) nor DMSO will dissolve PVC, a mixture of about 50:50 strength will in fact do so.

The foregoing information can be put the following useful use.

FIG. 3 shows a plastic compact in accordance with invention having one compartment filled with one solvent and the other compartment filled with another solvent.

In accordance with the present example, the compact is preferably produced from PVC. The one compartment is preferably filled with 100% TETRALIN® (tetrahydronaphthalene). The other compartment is preferably filled with an equal measure of 100% DMSO. The compartments are preferably sealed with PVC film barriers. The PVC film barriers present a pair of pull tabs sticking out one end of the PVC compact.

Figure 4:
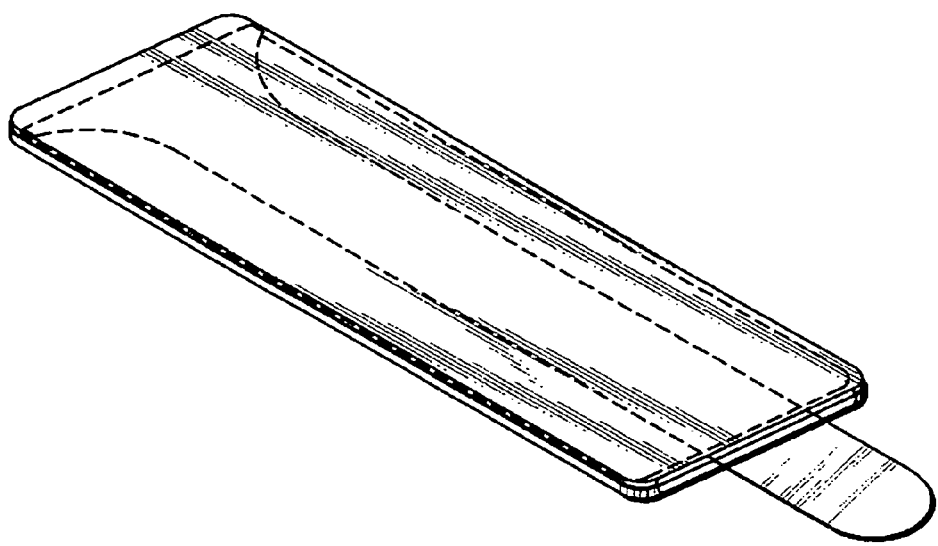
FIG. 4 is a perspective view of the compact of FIG. 3 closed with both solvents isolated from each for persisting in that state for an indefinite time period.

FIG. 4 shows the completed article. It comprises a closed compact with two sealed compartments of TETRALIN®(tetrahydronaphthalene) and DMSO respectively. As long as the two solvents never mix, the compact will persist in this state indefinitely.

Figure 5:
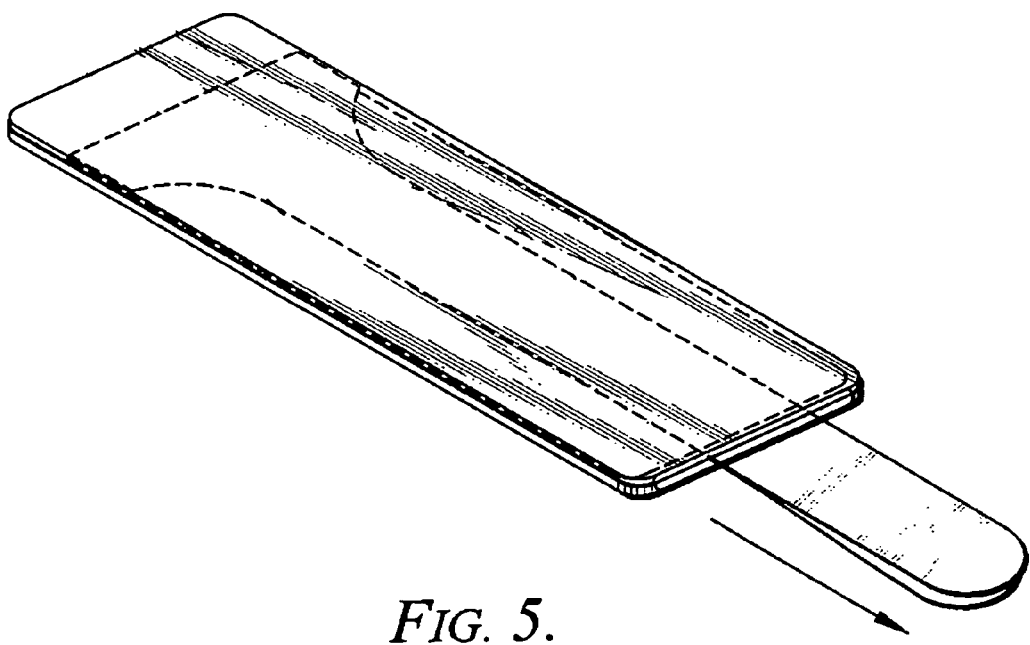
FIG. 5 is a perspective view comparable to FIG. 4 except showing the removal of the film barrier strips between the two solvents and hence beginning of the end dissolution of the compact into solution.

However, FIG. 5 shows how to start the vanishing act for this compact. That is, the user pulls the pull tabs and hence strips out the barrier films between the two solvents. Now the two are free to mix. The user can abandon the compact and, given time, with the user long since departed from the scene, the compact will dissolve into an un-recognizable form of its former self.

Whereas the objects of the invention have been given in view of the foregoing particular example, it is a completely different aspect of the invention to the Hansen solubility parameters to identify and experiment with other plastics and solvents respectively.

Figure 6:
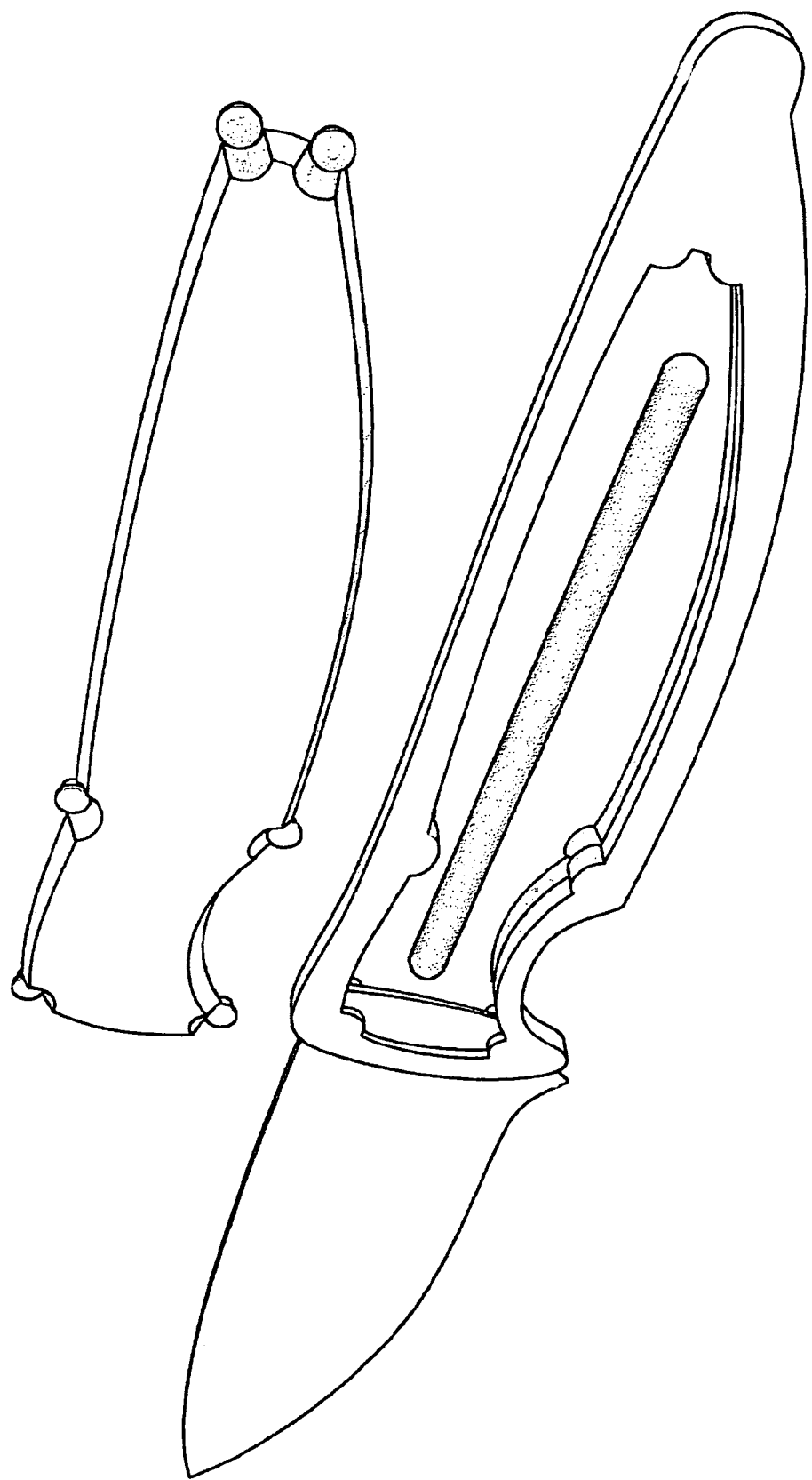
FIG. 6 is a perspective view of a knife in accordance with the invention wherein the compact of FIGS. 3 through 5 is configured to serve as the knife handle.

As stated above, it is an aspect of the invention that the compact can represent any number of handheld useful articles for use by a user. FIG. 6 shows one example handheld useful article that employs the two-solvent loading and partitioning concepts of the compact of FIGS. 3 through 5 until, that is, the user chooses to manually breach the partition, allow the two solvents to mix, and thereafter dissolve the handheld useful article. More particularly, FIG. 6 shows a knife in accordance with the invention wherein the knife handle thereof employs the concepts of two-solvent loading into two-partitioned compartments of the compact of FIGS. 3 through 5, until such time as the user chooses to breach the partition, allow the two solvents to mix, and thereafter dissolve the knife handle.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A vanishing compact comprising:
   a hollow shell of polymeric material;
   a partition partitioning the hollow shell into a first interior compartment sealed apart from a second interior compartment;
   a charge of a first solvent sealed inside the first compartment;
   a charge of a second solvent sealed inside the second compartment;
   wherein the first solvent is chosen for solubility properties such that the first solvent neither attacks nor dissolves the partition or shell material, and the second solvent is chosen for solubility properties such that the second solvent neither attacks nor dissolves the partition or shell material whereby, so long as the partition is not breached, the compact can carry the two solvents isolated and apart from each other such that the compact persists for an extended period of time;
   wherein the first and second solvents are further chosen for solubility properties such that a mixture between the charge of the first solvent and the charge of the second solvent has an independent set of solubility properties that determine that the mixture is capable of attacking and dissolving the polymeric material of the shell;
   a breaching operator to breach the partition and allow the charges of the first and second solvents to mix and thereby form the mixture therebetween, whereby the shell is dissolved by the solvent mixture;
   wherein the first and second solvents consist of tetrahydronaphthalene and Dimethyl Sulfoxide (DMSO) respectively; and
   wherein the polymeric material of the shell consists essentially of polyvinyl chloride (PVC), and the mixture solution comprises a 50:50 mixture by volume of tetrahydronaphthalene and Dimethyl Sulfoxide (DMSO).

2. The vanishing compact of claim 1, wherein:
   the partition is produced from the same polymeric material as the shell.

3. The vanishing compact of claim 1, wherein:
   the compact comprises a knife or a component thereof.

4. The vanishing compact of claim 1, wherein:
   the interior compartments have open rims and the partition comprises film strips covering over and sealed to the open rims of the compartments.

5. The vanishing compact of claim 4, wherein:
   the breaching operator comprises pull tabs for a user to manually strip the partition outside of the shell.

6. The vanishing compact of claim 5, wherein:
   the partition and pull tabs are separated apart from the shell when the partition is breached, thereby allowing separate disposal from the shell.

\* \* \* \* \*